United States Patent [19]
Goheen et al.

[11] Patent Number: 5,954,799
[45] Date of Patent: Sep. 21, 1999

[54] ACCESS TO TELECOMMUNICATIONS NETWORKS IN A MULTI-SERVICE ENVIRONMENT BY MAPPING AND EXCHANGING CONTROL MESSAGE BETWEEN CPE ADAPTORS AND ACCESS SERVER

[75] Inventors: Gregory L. Goheen, Terra Cotta; Mihai Focsaneanu, Nepean, both of Canada

[73] Assignee: Northern Telecom Limited, Montreal, Canada

[21] Appl. No.: 08/745,171

[22] Filed: Nov. 7, 1996

[51] Int. Cl.$^6$ ................................................. H04Q 11/04
[52] U.S. Cl. ........................ 709/250; 370/389; 370/351; 370/401
[58] Field of Search .................................. 370/351, 257, 370/420, 389, 401; 340/825.08; 379/93.17; 709/250

[56] References Cited

U.S. PATENT DOCUMENTS

| | | | |
|---|---|---|---|
| 5,610,910 | 3/1997 | Focsaneanu et al. | 370/351 |
| 5,621,731 | 4/1997 | Dale et al. | 370/257 |
| 5,764,155 | 6/1998 | Kertesz et al. | 340/825.08 |
| 5,771,279 | 6/1998 | Cheston et al. | 379/93.17 |
| 5,787,087 | 7/1998 | Visser et al. | 370/420 |

FOREIGN PATENT DOCUMENTS 2 283 154   4/1995   United Kingdom .

OTHER PUBLICATIONS

Gallagher, C.A., "IEEE 802.9: A Multi–Service Lan Interface", National Conference on Telecommunications, York, 2–5, Apr. 5, 1989, No. 1989, Apr. 2, 1989, Institution of Electrical Engineers, pp. 173–178, KP000041184, p. 174.

Miyamoto, T. et al., "Implementation and Evaluation of an IVDLAN Transmission Circuit", IEICE Transactions, vol. E74, No. 9, Sep. 1, 1991, pp. 2687–2695.

Patent Abstract of Japan, vol. 095, No. 004, May 31, 1995, &JP 07 007756 A (Hasegawa Electric Co. Ltd.), Jan. 10, 1995, Abstract.

*Primary Examiner*—Krisna Lim
*Attorney, Agent, or Firm*—Yoshiharu Toyooka

[57] ABSTRACT

In current voice telephony, CATV, and wireless networks, traffic is channelized for both access and transport, requiring a dedication of a fixed bandwidth end-to-end for the duration of a service connection. This channelization is wasteful of resources where multiple services have varying demands for bandwidth and holding times, or a service generates traffic that is bursty in nature. The invention addresses these problems by providing flexible and adaptable multiservice access to the networks. Customer requirements are checked by monitoring traffic on a local access at a connection request and/or during the established connection, and local access is configured according to transmission requirements. Customer traffic is segregated and routed to the appropriate network. One of the embodiments uses 2B1Q line coding and implements a novel protocol to perform the functions of the invention.

38 Claims, 7 Drawing Sheets

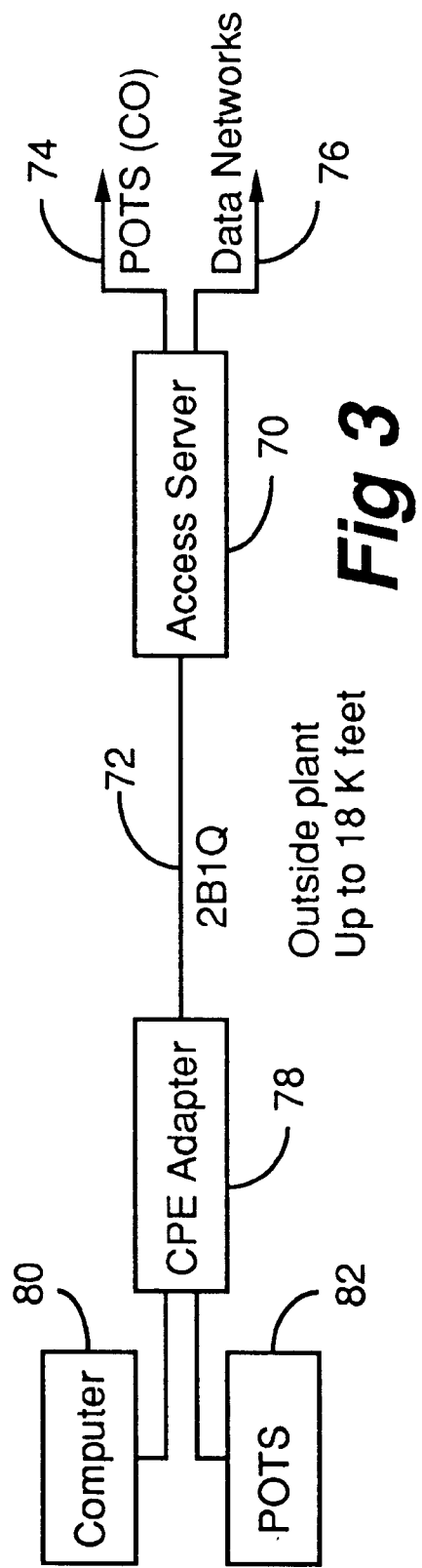
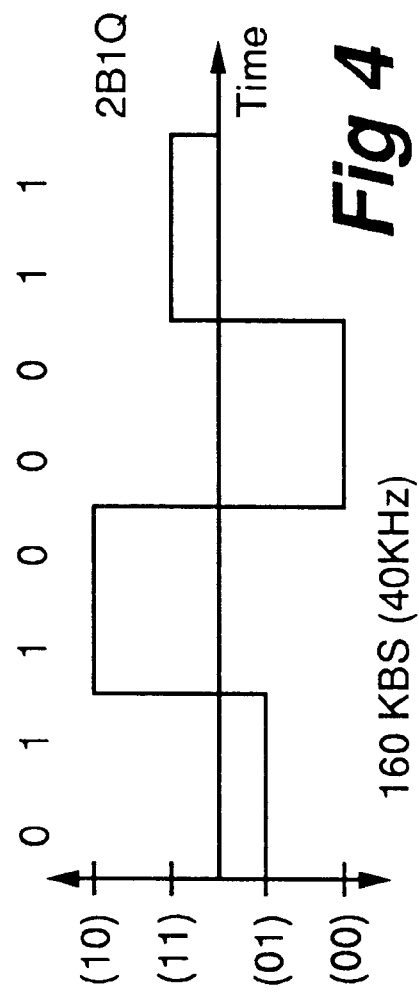

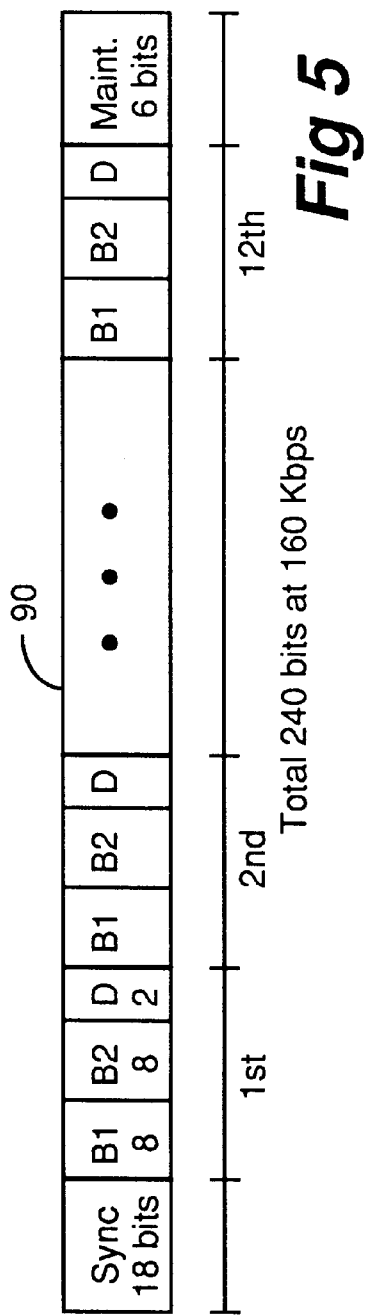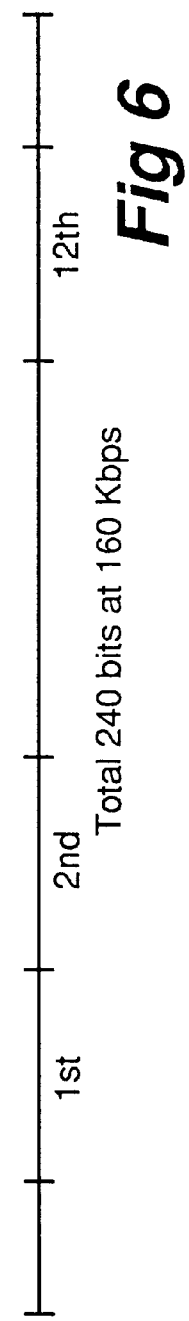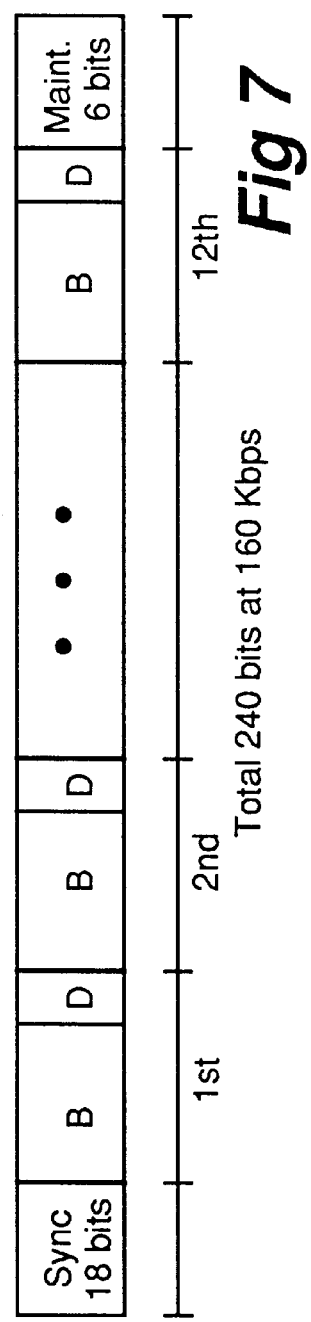

ACCESS TO TELECOMMUNICATIONS NETWORKS IN A MULTI-SERVICE ENVIRONMENT BY MAPPING AND EXCHANGING CONTROL MESSAGE BETWEEN CPE ADAPTORS AND ACCESS SERVER

FIELD OF INVENTION

The present invention relates generally to communication between customer premise equipment (CPE) and telecommunication networks. In particular, it is directed to novel implementations of a multi-service platform in an ISDN-like environment which allows a plurality of CPEs accessing any services provided by a plurality of service providers which may utilize any of a plurality of telecommunications networks.

BACKGROUND OF INVENTION

Facsimile machines and other data handling customer premise equipment are introduced not only into offices but individual homes in great numbers. As personal computers are found in more homes, users of computer networks such as "Internet" by way of telephone networks through modems are increasing in phenomenal numbers. The majority of these data transactions through modems or fax machines use existing local exchange carrier networks for data transmission. Fax machines, computers, and telephone sets at a customer premise are connected by local access to a central telephone switching office. Local access is variously called a subscriber's loop, local loop, drop etc. In cases of CATV or wireless, local access is also called subscriber connection, wireless access etc. It has been shown that the majority access "Internet" by dial-up telephone connection.

FIG. 1 shows how a telephone, fax, computer and other intelligent agents are typically connected through a publicly switched telephone network and data networks and their interconnections. Terminal equipment at a customer premise consist of a telephone set, fax machine, a personal computer etc., and are collectively called CPE which stands for customer premise equipment. CPE 10 is connected through inside wiring 12 at the customer premise and then through the feeder/distribution plant (also called subscriber's loop, local access loop) 14 to an access module (e.g. linecard) 16. The linecard is in turn connected to a local switch 18 that is part of the public switched telephone network (PSTN) 20. PSTN operates in channelized mode and provides continuous connection to another subscriber 22. The telephone service is established through a connection protocol (e.g. dialup, on-hook/off-hook protocol) and upon connection provides fixed channelized bandwidth on a continuous basis for the duration of the call. A facsimile connection is essentially the same as a telephone connection with the exception of the presence of a modem 24 at each facsimile terminal. The figure also shows a connection involving a data network. For such a connection, the CPE (e.g. computer) also requires a telephone subscriber's loop to the PSTN by dialup service which connects to a data service provider 26 through its own subscriber's loop 28. The data service provider 26 then provides a data connection through a data network 30 to a database service or other data service subscribers.

Computer connections are generally much longer in duration than voice or other connections. Computers perform data transactions in packets and their traffic is very bursty. The bursty traffic is more suitable for statistical multiplexing and is most efficiently handled by specially designed data networks such as packet switched networks. At present, however, all publicly switched traffic, data and voice, is sent over the subscriber's loop and interoffice trunking in a circuit switched network connection to destination customer premise equipment or to a data network.

Multimedia broadband switched networks by the name of the "Information Superhighway" have been widely proposed. This superhighway may carry different types of traffic seamlessly, accepting voice, data and video information from any terminal and delivering it to any other terminals simultaneously. At present, however, different types of networks, both channelized and packetized, exist separately and independently.

In circuit switched networks, a connection is maintained during the whole duration of a call through switches and other associated network elements, regardless of the type of the call. Only one circuit switched connection can be maintained for the call. No broadcast or multicast through the circuit switched network is possible. Today, telephone networks are becoming increasingly more occupied by data traffic which generates no additional revenues to the local exchange carriers. Furthermore, access to worldwide computer networks, such as "Internet" etc. is now being provided by commercial network service providers, such as "America Online", "SprintLink" etc. Using PSTN as the access, the network service providers provide access to various other private networks, academic networks etc., which contain vast numbers of databases for value added services.

FIG. 2 shows diagrammatically how data networks such as "Internet" are accessed through a telephone subscriber's loop. An individual end user subscribes to the service of a commercial network service provider 40. Access to a data network is usually by dialling the telephone number of a commercial data network service provider using a modem. Thus the end user CPE 42 uses a modem and makes a dialup connection to a local switch 44 by a subscriber's loop 46. The local switch 44 makes an inter-office trunk connection 48 to a terminating local switch 50 within a PSTN 52. The terminating local switch connects through a local loop 54 and a terminating modem to a service provider 40. After a proper modem handshaking protocol, the user inputs the address of a destination such as the "Internet" server with whom he desires a connection. Data networks and database services are accessed using a TCP/IP protocol. The "Internet" packet is routed over a T-1 link 56 (or other facilities) to the Internet 58. In this arrangement, the local switches 44 and 50 as well as the interoffice trunk 48 are occupied for the duration of the connection, which is usually measured in hours rather than the shorter holding time associated with voice calls which are measured in minutes. Consequently, very expensive common equipment in the PSTN is required for the duration of the "Internet" access, even during a period of inactivity by the end user.

The use of a telephone network by network service users increases usage of the telephone network enormously without a proportionate increase of additional revenues to the telephone company. It is also cumbersome for an individual user to access various networks. It will be shown below that the present invention reduces this investment in the PSTN as well as enhances the capabilities of the overall global communications network.

The U.S. Pat. No. 5,610,910, filed on Aug. 17, 1995 and issued on Mar. 11, 1997 having a common inventor, describes a new access architecture which improves the access to telecommunications networks including various different types of networks. It involves a local access which determines the kind of service requested by a connection request and selects access directly to the network requested or a network which is decided upon preset conditions.

The present invention expands on this access architecture and is directed to a novel implementation which allows efficient use by data and voice traffic of available bandwidth between CPEs and the telecommunications network in an ISDN-like environment.

OBJECTS OF THE INVENTION

It is an object of the invention to provide a method of and apparatus for utilizing efficiently the available bandwidth of the local access by voice and/or data traffic.

It is another object of the invention to provide a method of and apparatus for allocating the available bandwidth as a whole or any specific subset to a service subscribed by the end user.

It is a further object of the invention to provide a method of and apparatus for allocating dynamically a part of the available bandwidth to a specific service.

It is yet another object of the invention to provide a method of and apparatus for simultaneous multiple service delivery over the same access network.

It is still a further object of the invention to provide a method of and apparatus for routing traffic to an appropriate network or CPE device by identifying the type of requested service.

SUMMARY OF THE INVENTION

Briefly stated, according to one aspect, the invention is directed to a method of interfacing directly one or more CPEs with either or both PSTN and data networks by way of a CPE adapter, an access medium and access server. The method comprises steps of exchanging control messages between the CPE adapter and the access server to determine the type of service request. The method further comprises steps of mapping the control messages onto the access medium using either or both a channelized and a non-channelized format and selecting between a telephone interface connected to the PSTN or a data network interface connected to the data networks in response to the type of service request.

According to another aspect, the present invention is directed to an access server for directly interfacing CPEs with PSTN or a data network by way of a CPE adapter and an access medium. The access server comprises a telephone interface unit to be connected to the PSTN and a data network interface unit to be connected to the data network. The server further includes a transceiver to be connected to the CPE adapter for exchanging end user's traffic and control messages therebetween, and a controller unit for selecting a connection of the transceiver either with the telephone interface unit or with the data interface network unit in response to the control messages.

According to a further aspect, the present invention is directed to an access apparatus for interfacing CPEs and a telecommunications network which encompass PSTN and data networks in a multiservice environment. The apparatus comprises a CPE adapter to be connected to one or more CPEs and an access server having a telephone interface unit and a data network interface unit. The apparatus further includes a first transceiver in the CPE adapter and a second transceiver in the access server to be connected with one another by a pair of wires, the first and the second transceivers for exchanging control messages through a signalling channel. The apparatus also includes a controller for selecting either the telephone interface unit or the data network interface unit in response to the control messages.

According to yet another aspect, the invention is directed to a CPE adapter for directly interfacing CPE with PSTN or a data network by way of an access server. The CPE adapter comprises a telephone interface unit to be connected to one or more analog CPEs and a data network interface unit to be connected to one or more data CPEs. The CPE adapter further includes a transceiver to be connected to the access server for exchanging control messages therebetween and a controller unit for selecting a connection of the transceiver either with the telephone interface unit or with the data network interface unit in response to the control messages.

BRIEF DESCRIPTION OF THE DRAWINGS

FIG. 3 is a block diagram of a local access according to an embodiment of the invention;

FIG. 4 shows graphs which indicate the construction of 2B1Q signals;

FIG. 5 shows a frame structure of ISDN;

FIG. 6 shows a frame structure of a signal exchanged between an access server and a CPE adapter, according to one embodiment of the invention;

FIG. 7 shows a frame structure of a signal exchanged between an access server and a CPE adapter, according to another embodiment of the invention;

DETAILED DESCRIPTION OF PREFERRED EMBODIMENTS OF INVENTION

Figure 1:
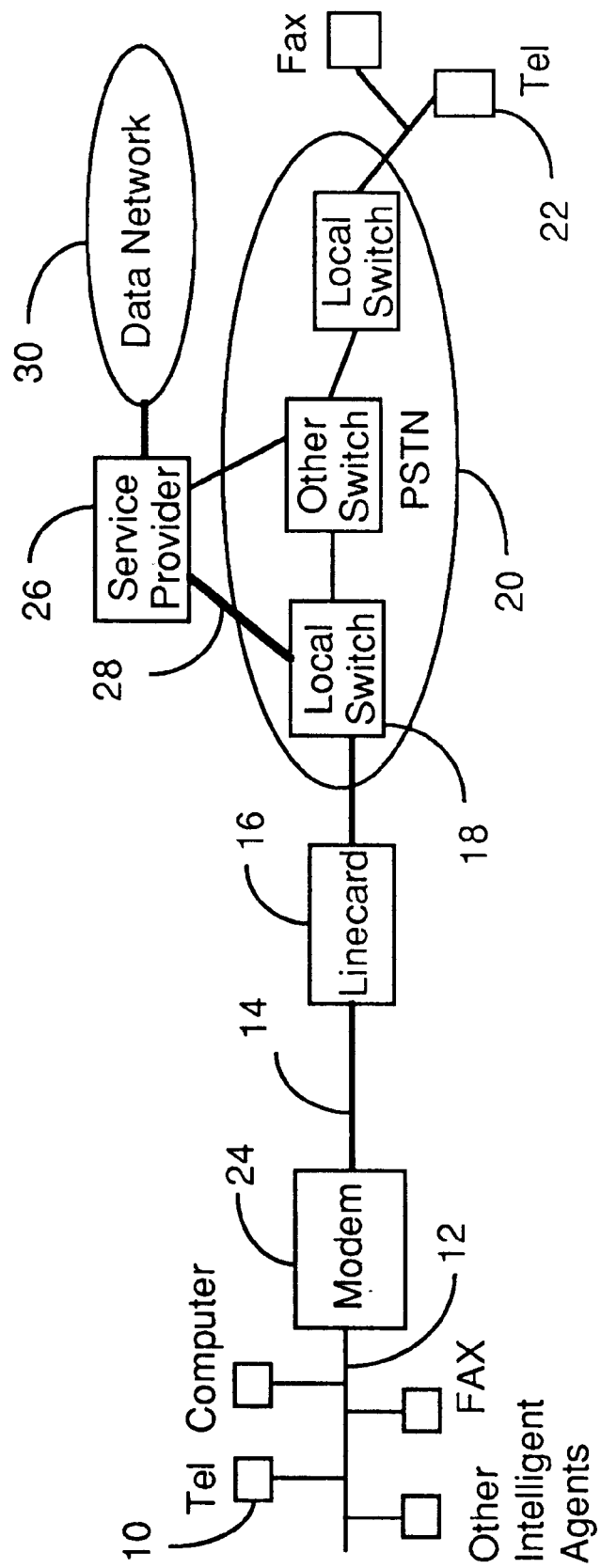
FIG. 1 shows access to service providers such as a public switched network and data networks service providers.
Figure 2:
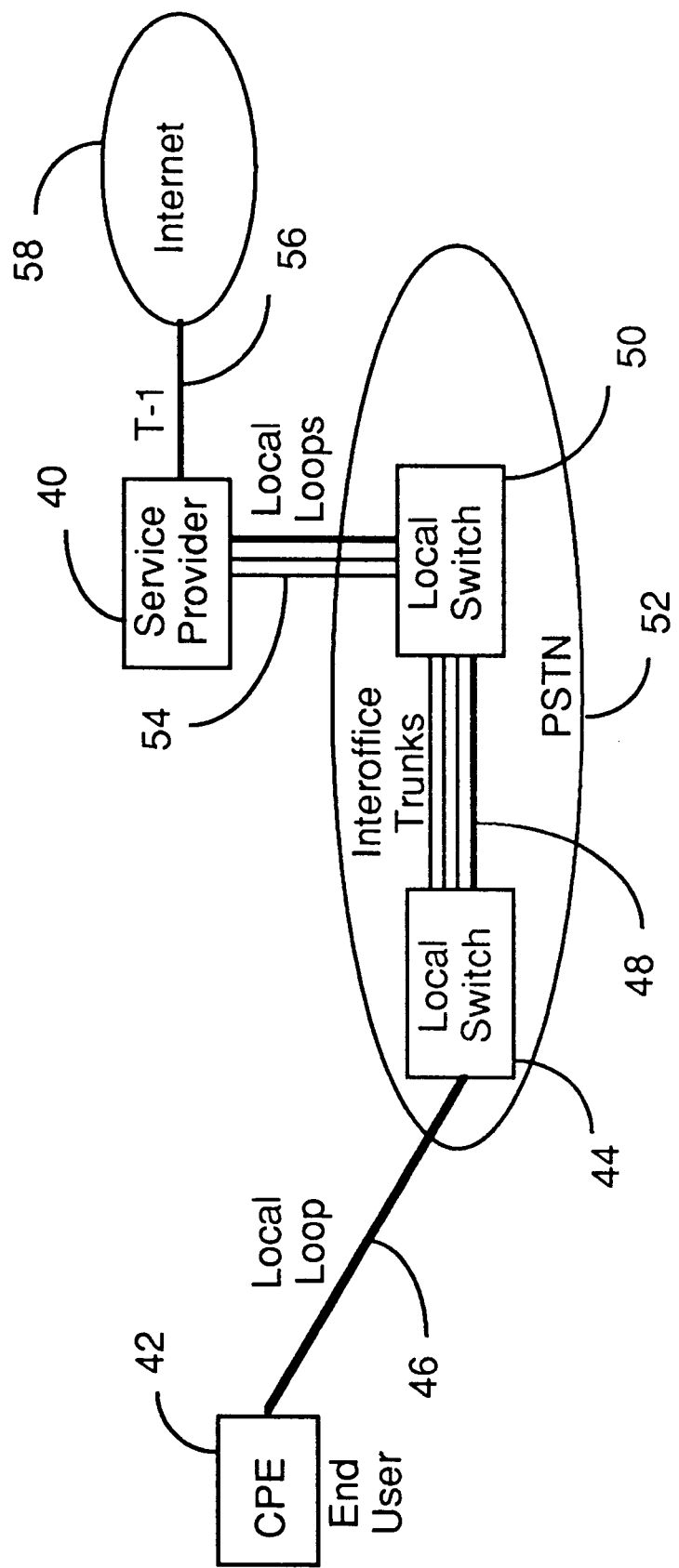
FIG. 2 is a schematic illustration of a presently used "Internet" access.

This invention defines a new architecture between the CPE adapter and the access server and a new communications protocol between them. This new protocol introduces specific messages to facilitate appropriate routing of the requested services, negotiation of the bandwidth between the CPE adapter and the access server and so on, in response to specific service requirements. Some service information, for example CLASS services, is passed transparently. Various existing communications protocols can be used as the base for implementing the proposed new access communications method, LAN-type e.g., Ethernet, TCP/IP, X.25, Token Ring, Frame Relay, 10BaseT, Token Bus, FDDI, X.25, ATM WAN etc.

According to one embodiment of the invention, the new communication architecture uses 2B1Q loop technology to connect the CPE adapter and the access server. The ISDN structure is used to support voice and data services on the same access line where there is no need to modify it. This invention introduces a number of new protocols which are not found in ISDN.

Referring to FIG. 3, an overall access to a telecommunications network is described according to one embodiment. In the Figure, an access server 70 is a device which provides functions for separating voice and data traffic from a 2-wire subscriber telephone loop 72. Voice traffic is routed to the central office telephone equipment 74 using standard POTS interfaces. Data traffic is routed to a digital "data" network 76 which may use any type of equipment and transmission protocols suitable for the intended application. The access server is generally located at or adjacent to the central office equipment. A CPE adapter 78 which is located at a customer premise is designed to perform protocols of the new architecture in cooperation with the access server and provides data interfaces to the user's computer terminals 80 for accessing data networks such as the Internet or a corporate WAN. In addition, the CPE adapter provides POTS interfaces for connecting analog telephone devices 82, such as a POTS telephone, Fax, and analog modem. The PSTN interface unit can be a VF interface, a DS-1 interface supporting PRI, TR-08 or TR303, or an E1 interface supporting PRI, V5.1 or V5.2.

The invention also achieves "bandwidth-on-demand", which means that user data is allocated the full available bandwidth until one or more portions are needed for one or more analog voice calls. At the termination of one or more of such voice calls, the bandwidth will be returned to the data traffic. This feature will be described in detail later.

The access server connects to the subscriber's CPE adapter using 2B1Q loop technology, often referred to as a "U" loop in ISDN terminology. 2B1Q (2 Bits 1 Quaternary) is a line coding protocol scheme which is characterized by efficient use of available bandwidth. As seen in FIG. 4, physically, 2B1Q provides bi-directional digital transmission between two points over standard 2-wire metallic loops in the outside plant over the frequency of 40 KHz at 160 Kbps transmission. The access server implements the "LT" (line termination) side of the 2B1Q protocol while the CPE implements the "NT" (network termination) side. The 2B1Q protocol provides "layer 1" functionality and is fully described in the ANSI T1.601 specification.

FIG. 5 shows an ISDN frame structure of a signal exchanged between LT and NT through the loop, which frame is composed of 240 bits. As seen in the figure, the frame 90 begins with 18 bits for synchronization followed by 12 sections of customer usable data, each of which is made up of B1 and B2 channels 92 and 94, each with 8 bits, and D channel 96 of 2 bits. The last 6 bits are used for maintenance. As mentioned earlier, the transmission speed is 160 Kbps, which provides 64 Kbps each for B1 and B2 channels and 16 Kbps each for D channel and the maintenance channel. The maintenance channel 98 is used for maintenance of the loop such as performance testing, sealing current measurement, loopback etc. The D channel carries messaging between the customer's equipment and the access server without requiring any bandwidth from the 64 Kbps B channels. The D channel signalling is based on ISDN Q.921 (Layer 2) and Q.931 (Layer 3) protocols as well as ISDN call-control messaging.

FIGS. 6 and 7 show frame structures exchanged between the CPE adapter and access server according to embodiments of the invention. In both Figures, a frame consists of 240 bits at 160 Kbps and starts with 18 bits for synchronization. In FIG. 6, 18 bits which make up 2B and D channels in ISDN are treated in a block. There are 12 blocks in a frame. The block can be used as a 144 Kbps pipe which supports user data traffic as well as control messaages. It is noted that, as contrasted with "channelization", "non-channelization" means that control messages are not sent through a special channel set aside for messaging but they share the same channel with other data. When a voice call request is detected either at the CPE adapter or at the access server while data traffic is proceeding between them, messages are exchanged to halt the data traffic and a specific portion of each block will be assigned to the requested voice call, with the remaining portion being used for the data traffic. When the voice call is terminated, the assigned portion is returned to the data traffic. In FIG. 7, D channel of the ISDN is maintained but two B channels form one channel block. D channel is used for messaging and assigned a fixed 16 Kbps channel. In both figures, the block of channels is used in a non-channelized format for any number of data connections. Generally speaking, a voice call requires 64 Kbps. Therefore, when a voice call is accepted, the data traffic will be carried through the remaining 64 Kbps pipe. However, if the voice call is compressed, requiring less than 64 Kbps, the remaining bandwidth can be larger than 64 Kbps.

Figure 8:
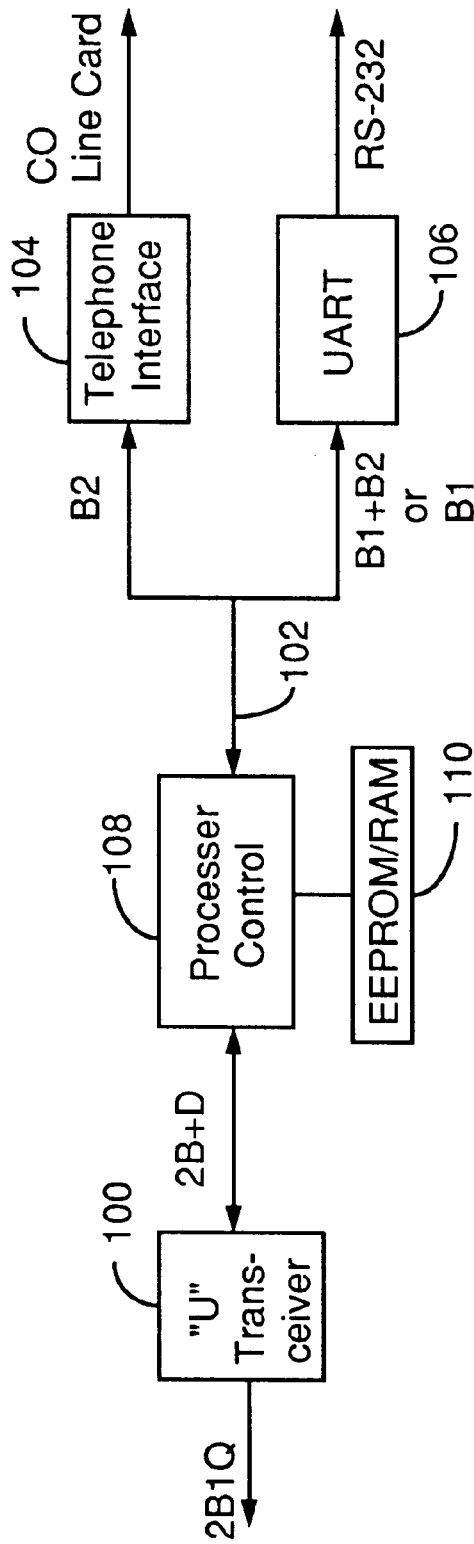
FIG. 8 is a block diagram of an access server according to one embodiment.

Referring to FIG. 8, an access server according to an embodiment is schematically illustrated in block diagram form. The access server includes a transceiver 100 which communicates with a CPE adapter (shown in FIG. 3) through a pair of wires 102 using 2B1Q line coding protocol. At the network side of the access server, an analog telephone unit 104 connects to the central office line card of the PSTN and provides digital/analog conversion functions, ring detection and off/on-hook control. An UART (Universal Asynchronous Receiver Transmitter) 106, on the other hand, communicates to the data networks by transmitting and receiving data using a standard RS232 interface. A microprocessor control 108 executes the firmware which controls all aspects of the access server. It is responsible for decoding the signalling protocol, setting up voice and data calls and controlling the hardware devices connected to its bus. Specifically the transceiver interfaces the 2-wire loop to the microprocessor's internal digital bus and handles all aspects of 2B1Q (Layer 1) protocol. EEPROM/RAM 110 stores the microprocessor executable code and random access memory for program use. Part of this memory is nonvolatile so that specific operating parameters can be stored and later recalled under power-down conditions.

In this embodiment, the ISDN frame structure shown in FIG. 5 is used. Data is carried on two B channels concatenated together to form a 128 Kbps pipe. During a voice call, however, data is limited to using only the B1 channel, with voice assigned to the B2 channel. Data is transmitted on the B-channel(s) using V.120 protocol frames. Voice is carried by 8 KHz sampled PCM converted to and from analog at each end.

Separation of data and voice is achieved by examining specific D channel messages. If a user-initiated voice call attempt is detected, a B2 channel is allocated for the voice PCM and the central office notified by signalling the off-hook condition. A voice path is then immediately established between the user's telephone at the CPE side and the central office line card through the access server. Incoming voice calls are handled by notifying the CPE equipment using D channel signalling.

Figure 9:
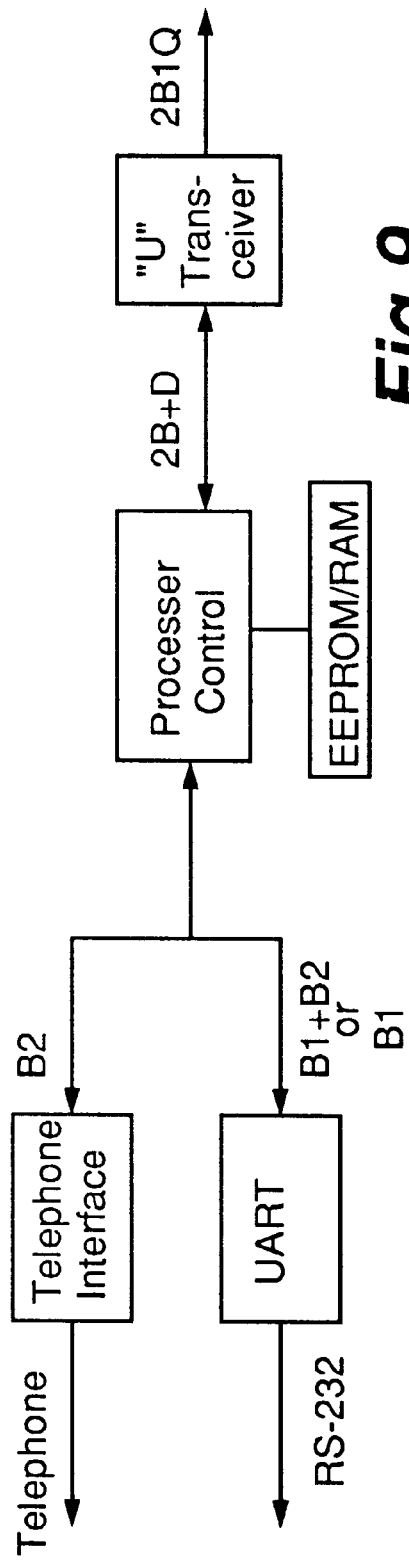
FIG. 9 is a block diagram of a CPE adapter according to one embodiment.

FIG. 9 shows a block diagram of a CPE adapter which is composed of similar hardware as the access server described above except for the telephone interface 120. Therefore, the transceiver communicates with the corresponding transceiver of the access server. There is also a microprocessor control and an EEPROM/RAM. On the CPE side, a UART connects with a computer at the customer's premise using a standard RS-232 interface. The telephone interface 120 is a standard interface to an analog (POTS) telephone and provides digital/analog conversion functions, ring generation and off/on-hook monitoring. As mentioned earlier, "on-hook" signalling is also supported for CLASS services, e.g. caller ID etc. In this case, the access server detects the information from the switch and converts it to a D channel message. The CPE adapter translates the D channel message in a CLASS signal and applies it to the analog telephone.

As seen in the above description, the communication scheme of the invention optimizes the use of the available bandwidth. The scheme consists of allocating an appropriate amount of available bandwidth to a specific service request. For example, a data communications service will be provided with full use of the access bandwidth. The allocation of bandwidth to services is performed by a communication scheme supporting negotiation between the CFE adapter and the access server.

As described above in connection with FIGS. 5, 6 and 7, the bandwidth available between the CPE adapter and the access server can be allocated as a whole, or as a specific subset to the services subscribed to by the end user. A multitude of signal formats may be used to transport user information across the access. This invention also simultaneously supports any combination of access transport techniques, channelization, packet-based and cell-based.

The negotiation of the bandwidth allocation is done dynamically by the CPE adapter and the access server via a common signalling channel network. The signalling channel uses a packet-based, or a cell-based, protocol to encode the signalling information onto the physical access line. The signalling channel bandwidth can be dedicated to the signalling function or can be shared with other customer traffic in a non channelized format.

According to one embodiment, the access can take two states: the default state and the alternate state. In the "default state", the available bandwidth is allocated to a data communications service. The customer's data terminal is provided with a communication path to the data network using the available bandwidth. The "default state" can be changed into the following "alternate state", in which a new service request is addressed by allocating a subset of the total available bandwidth to this session. The amount of bandwidth allocated is defined by the specific service needed. In this "alternate state", the amount of bandwidth available to the data terminal is reduced and, consequently, the maximum speed of data transfer is reduced accordingly. The "alternate state" is reverted to the "default state" upon termination of the session. In the "alternate state", a compression function can be used in which the available amount of bandwidth is lower than the bandwidth required by the new service request. Negotiation between the CPE adapter and the access server will define and allocate a lower amount of bandwidth to the new service, invoking a predefined compression technique.

The operation of the access server and CPE adapter according to one embodiment will be described below.

Initialisation

Upon power-up, both the access server and the CPE adapter automatically attempt to synchronize the 2B1Q loop so that a reliable communication link can be established. In ISDN terminology, this is called "layer 1 activation" and is performed in accordance with the ANSI T1.601 specification. When U-loop synchronization is successful, the U-transceiver informs the microprocessor, which then can begin its higher layer initialization. Note that activation is attempted until successful—there are no time outs in the event that one side is unable to activate. Reactivation also takes place if the event synchronization is lost.

After layer 1 has been successfully activated, the link layer (layer 2) on the D-channel is initialized. Both access server and CPE adapter use essentially Q.921, an ISDN standard protocol, to exchange data frames. The C/R bit (Command/Response bit) is set for symmetrical operation. Initialization takes place by each side continually sending SABME frames and awaiting a UA response. When this occurs, layer 2 initialization is complete. In the present invention, a dummy TEI of 1 is used to satisfy the requirements of the ISDN link layer.

The access server and CPE adapter then initialize its Layer 3 protocol which is based on the standard ISDN protocol, Q.931. Initialization takes place by exchanging dummy service profile (SPID) values and dummy terminal endpoint identifier (EID's). When this step is complete, the access server and CPE adapter are ready to exchange call control messages necessary for setting up data and voice calls.

Figure 10:
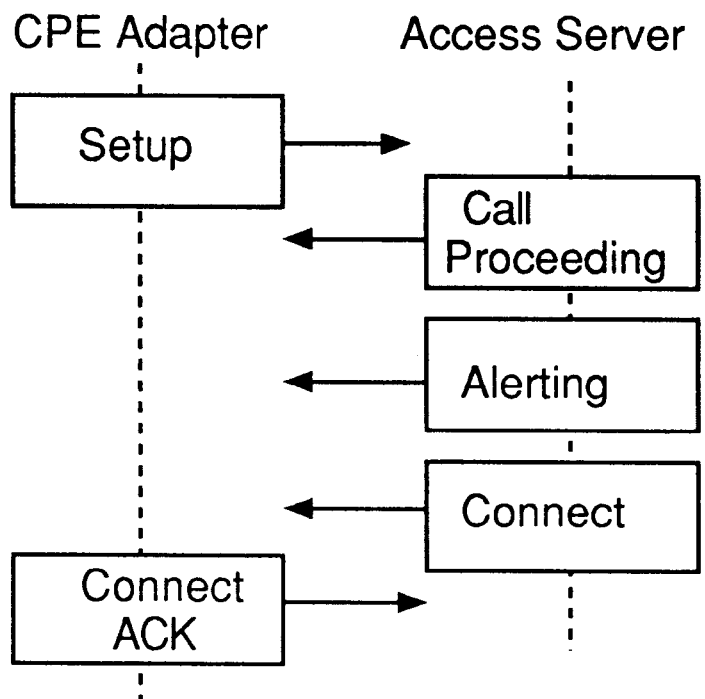
FIG. 10 is a diagram of a data call setup between a CPE adapter and an access server.

Data Call Setup (FIG. 10)

From an application level, the CPE adapter uses standard serial communication procedures for setting up data calls. This involves sending "AT" commands from the attached computer to the CPE adapter. The AT command used to establish a data connection is ATD<number>, the same command used by application software to set up a modem call. Since, in this invention, data calls from the CPE are not routed through the public network, any destination number can be specified. The purpose of this "data call setup" is to establish a path from the user's computer through to the data device connected to the access server.

When the CPE adapter receives the command to establish the data connection, it sends a D channel Q.931 SETUP message to the access server. (Refer to the Q.931 specification for details on the format of this message. In this specification, other relevant Q.931 messages are indicated in capital letters.) Encoded in this message is an indication of whether one or two B channels are to be used for carrying the data. This invention uses the "Bearer Capability" field coded as "56 Kbps" for one B channel and coded "64 Kbps" for two B channels.

The complete call message is shown in FIG. 10.

Data Transmission

After the call has been connected, a data path is established between the two devices. Asynchronous data entering the CPE adapter's serial port is converted to V.120 frames and carried across the 2B1Q link. This invention provides full-duplex operation so that data coming from the data network is also sent across the 2B1Q link in the same manner. When two B channels are used to carry data, the B1 and B2 channels are concatenated together to form a full duplex 128 Kbps pipe, otherwise the data is confined to a single B channel (in this case the B1 channel).

The access server and CPE adapter in this embodiment uses asynchronous data format on its serial port, as detailed in the RS-232 specification. Data consists of a start bit, followed by 8 bits of data, followed by a stop bit. The default asynchronous speed is 115.2 Kbps but may be adjusted to the rate used by the computer. Note that the speed and format of the asynchronous port is independent of the speed and format used to carry the data across the 2B1Q loop.

Hardware flow control, to prevent data overruns, is also provided. This method uses the RS-232 leads CTS and RTS to control data flow. CTS is a signal from the CPE adapter towards the computer. This lead is normally on to indicate that the CPE adapter can accept data and off to signal the computer to stop sending data. In a similar manner, the RTS lead is used by the computer to flow on or off data from the CPE adapter.

Call Clearing

Data calls may also be cleared or disconnected by a user invoked AT command (ATH). In this case, the CPE adapter sends a DISCONNECT message to the access server. The access server returns a RELEASE message followed by a RELEASE COMPLETE from the CPE adapter. This completes the call clearing handshake. The B channel connection is taken down and no further data can be transmitted until the data call is reestablished.

Making a Voice Call

The user initiates a voice call by picking up the attached handset that is connected to the analog port of the CPE adapter. This causes a Q.931 SETUP message to be sent to the access server in a manner similar to an ISDN voice call. The access server distinguishes between voice and data calls by examining the Bearer Capability field of the SETUP message. An encryption of VOICE or 3.1 KHz indicates a voice call.

When the SETUP message is received from the CPE adapter, the access server returns a CALL PROCEEDING message and, at the same time, presents an off-hook condition towards the central office. This action initiates a standard POTS call through the telephone network.

A CONNECT message is also returned to the CPE adapter which is a signal to connect the B2 channel to the codec of the analog port. After these events are complete, the user's telephone is, in effect, connected directly to the central office. Note that digit collection does not take place by either the CPE adapter or the access server—the central office handles all aspects of the voice call including dial tone and DTMF digit reception (pulse dialling is not supported by this embodiment).

Voice calls always use the B2 channel to transmit PCM voice data. If a data call is already present it must unallocate the B2 channel and switch to single B channel operation for the duration of the voice call.

Figure 11:
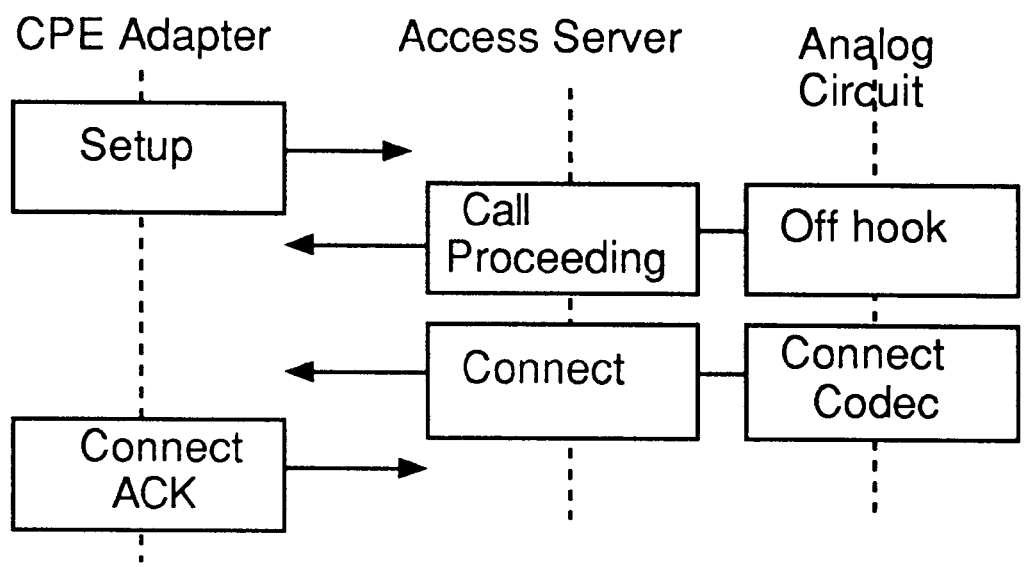
FIG. 11 is a diagram of a voice call setup between a CPE adapter and an access server.

Incoming Voice Calls (FIG. 11)

An incoming voice call is initiated by someone else on the network with the intention of being answered by the user connected to a CPE adapter. The central office line card sends ringing voltage on the loop in order to ring the handset. This ringing cycle is detected by the analog circuit in the access server and a D channel message sent to the CPE adapter. This message causes the analog phone attached to the CPE adapter to ring. When the user picks the handset up to answer the call, this is treated as a normal call attempt and follows the procedures for Making a Voice Call.

The embodiment uses a Q.931 NOTIFY message encoded as a "call information/event" to indicate the presence of ringing. This message is sent on each ringing cycle detected. Therefore, if the call is abandoned by the far end, ringing will simply stop at the CPE adapter.

Figure 12:
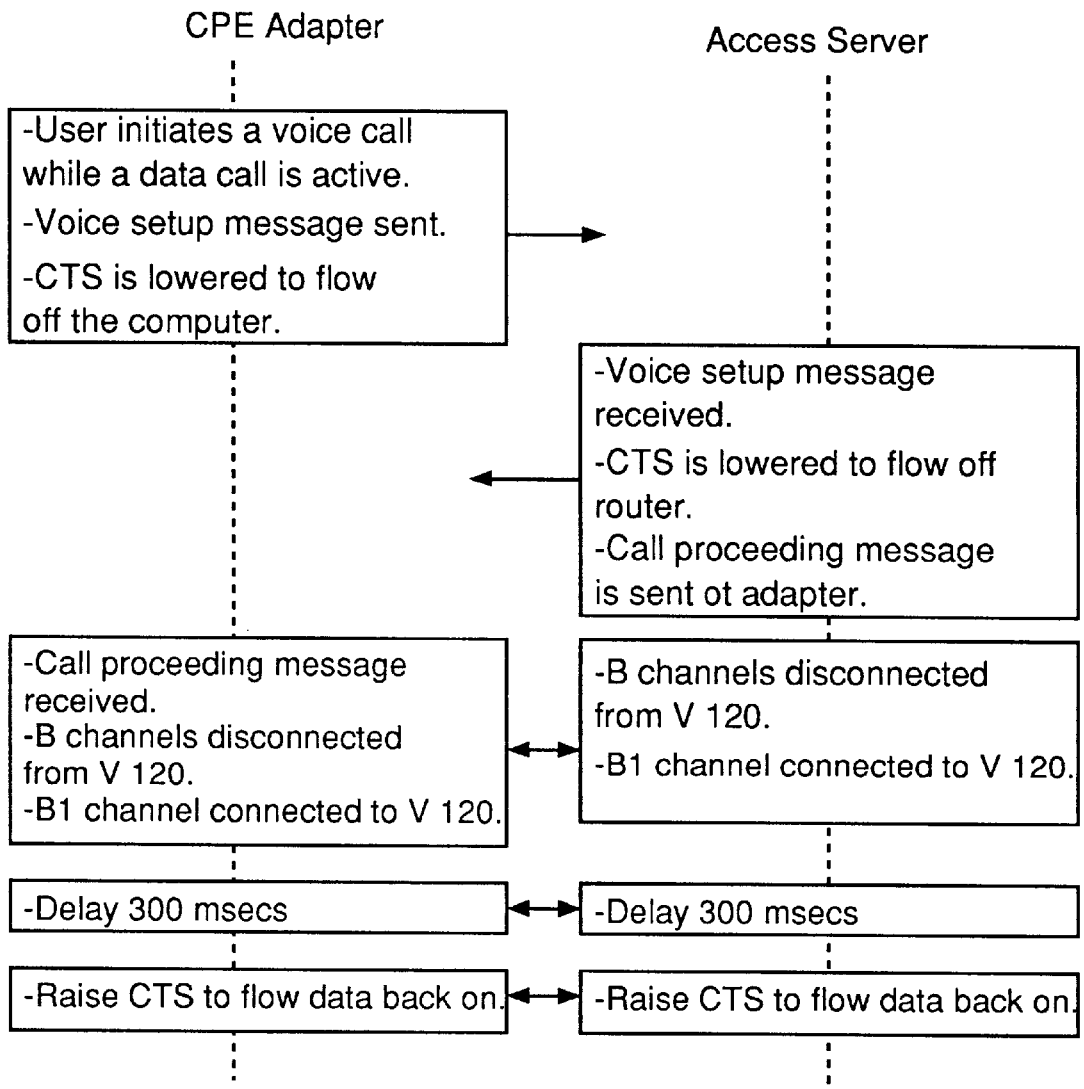
FIG. 12 is a chart showing the series of events which occur during the bandwidth management operation in one particular embodiment.

As discussed earlier, the invention also performs channel management techniques when a B channel is needed for voice but it is currently in use for data. This must be done "on the fly" without disturbing the data session in progress. This is shown in FIG. 12.

When the access server detects the incoming voice SETUP message from the CPE adapter, it lowers CTS to flow off data from its computer. Likewise, the CPE adapter also flows off data when it initiates a voice call. When the Call Proceeding message is sent back to the CPE adapter, the data call is just connected to the B1 channel, thus freeing up the B2 channel for voice. After a short period of time (e.g. 300 ms), data flow is resumed by setting CTS active.

This action allows not only coordination of the B channels between the access server and CPE adapter but also allows a short period of time for the buffers to empty before switching to one B channel (this helps to prevent data loss during the switch-over).

Similarly, when the phone goes back on-hook, the process is reversed. Data is flowed off the second B channel added to the data; then data flow is resumed.

What is claimed is:

1. A method of directly interfacing one or more CPEs with either PSTN or data networks by way of an access network which comprises a CPE adapter connecting one or more CPEs, an access server connecting the PSTN through a telephone interface and data networks through a data network interface and an access medium connecting the CPE adapter and the access server, comprising steps of:

exchanging control messages between the CPE adapter and the access server to determine a type of service request;

mapping the control messages onto the access medium;

transiting to either a default state or an alternate state in response to the control messages, the default state being a state in which the access network is in condition for data transfer in the non-channelized format and the alternate state being a state in which the access network is in condition for data transfer in the either or both of the channelized and non channelized formats; and selecting between a telephone interface connected to the PSTN or a data network interface connected to the data networks in response to the type of service request.

2. The method according to claim 1 further comprising steps of:

detecting control messages identifying one or more voice service connection requests;

putting the access network in an alternate state in response to the control messages;

mapping one or more voice service connections onto one or more channels on the access medium using a channelized format;

adjusting the bandwidth for data service connection;

mapping the data service connection if any onto the access medium using a non-channelized format; and selecting the telephone interface connected to the PSTN for the voice service connection and the data network interface connected to the data networks for the data service connection.

3. The method according to claim 2 comprising a further step of:

allocating a smaller amount of bandwidth to one or more voice service connections by using voice compression technicques.

4. The method according to claim 3 further comprising steps of:

exchanging control messages between the CPE adapter and the access server when one or more established voice service connection is terminated; and adjusting the bandwidth for the data service connection.

5. The method according to claim 4 wherein data and control messages exchanged between the CPE adapter and the access server are in framed digital bit signal streams using 2B1Q line coding scheme.

6. The method according to claim 2 further comprising steps of:

exchanging control messages between the CFE adapter and the access server when one or more established voice service connections are terminated; and adjusting the bandwidth for the data service connection.

7. The method according to claim 6 wherein data and control messages exchanged between the CPE adapter and the access server are in framed digital bit signal streams using the 2B1Q line coding scheme.

8. The method according to claim 7 wherein available bandwidth of the access network is partitioned using the ISDN scheme.

9. The method according to claim 8 wherein the default state provides a data service connection, comprising a further step of:

assigning B1 and B2 channels to the data service connections.

10. The method according to claim 9 wherein the alternate state provides simultaneous data and voice service connections, further comprising steps of:

assigning the B1 channel to the data service connection; and assigning the B2 channel to the voice service connection.

11. The method according to claim 10 comprising a further step of assigning B1 and B2 channels to the data service connection when the voice service connection is terminated.

12. An access server for interfacing CPEs with PSTN or a data network by way of a CPE adapter and an access medium comprising:

a telephone interface unit to be connected to the PSTN;

a data network interface unit to be connected to the data network;

a transceiver to be connected to the CPE adapter via the access medium for exchanging end user's traffic and control messages therebetween, the control messages specifying a type of service request and a controller unit for transiting the access server into either a default state or an alternate state in response to the control message, the default state being a state in which the access server is in condition for data transfer in the non-channelized format and the alternate state being a state in which the access server is in condition for data transfer in the either or both of the channelized and non channelized formats; and the controller unit further for selecting a connection of the transceiver either with the telephone interface unit or with the data network interface unit in response to the type of service request.

13. An access server according to claim 12 wherein:

the default state is a state in which the CPE adapter transceiver and the access server transceiver communicate with each other to receive and deliver data services traffic in a non-channelized format; and the alternate state is a state in which the CPE adapter transceiver and the access server transceiver communicate with each other to allocate a portion of the available bandwidth to receive and deliver voice services in a channelized format and to allocate the remaining bandwidth to receive and deliver data services traffic in a non-channelized format.

14. An access server according to claim 13 wherein:

in the alternate state, the CPE adapter transceiver and the access server transceiver communicate with each other to activate voice compression functionality.

15. The access server according to claim 14 wherein the transceiver is connected to a CPE adapter by a pair of twisted wires which carry digital signal streams providing a predetermined bandwidth.

16. The access server according to claim 15 wherein the framed digital bit signal streams are transmitted in a 2B1Q line coding scheme.

17. The access server according to claim 16 wherein the available bandwidth is partitioned using the ISDN scheme.

18. The access server according to claim 17 wherein the data network interface unit comprises a UART having RS-232 interfaces, Ethernet, 10BaseT, Token Ring, Token Bus, or FDDI LAN interfaces, X.25, Frame Relay or ATM WAN interfaces.

19. The access server according to claim 18 wherein the PSTN interface unit is a VF interface, a DS-1 interface supporting PRI, TR-08 or TR303, or an E1 interface supporting PRI, V5.1 or V5.2.

20. The access server according to claim 13 wherein the transceiver is connected to a CPE adapter by a pair of twisted wires which carry digital signal streams providing a predetermined bandwidth.

21. The access server according to claim 20 wherein the framed digital bit signal streams are transmitted in a 2B1Q line coding scheme.

22. The access server according to claim 21 wherein the available bandwidth is partitioned using the ISDN scheme.

23. The access server according to claim 22 wherein the data network interface unit comprises a UART having RS-232 interfaces, Ethernet, 10BaseT, Token Ring, Token Bus, or FDDI LAN interfaces, X.25, Frame Relay or ATM WAN interfaces.

24. The access server according to claim 23 wherein the PSTN interface unit is a VF interface, a DS-1 interface supporting PRI, TR-08 or TR303, or an E1 interface supporting PRI, V5.1 or V5.2.

25. An access apparatus for interfacing CPEs and a telecommunications network which encompass PSTN and data networks in a multiservice environment, comprising:

a CPE adapter to be connected to one or more CPEs;

an access server having a telephone interface unit and a data network interface unit;

a first transceiver in the CPE adapter and a second transceiver in the access server to be connected with one another by a pair of wires, the first and the second transceiver for exchanging control messages therebetween, the control messages specifying a type of service request; and a controller unit for transiting the access apparatus into either a default state or an alternate state in response to control messages the default state being a state in which the access apparatus is in condition for data transfer in the non-channelized format and the alternate state being a state in which the access apparatus is in condition for data transfer in the either or both of the channelized and non channelized formats; and the controller unit further for selecting either the telephone interface unit or the data network interface unit in response to the the type of service request.

26. A CPE adapter for interfacing CPEs with PSTN or a data network by way of an access server comprising:

a telephone interface unit to be connected to one or more analog CPEs;

a data network unit to be connected to one or more data CPEs;

a transceiver to be connected to the access server for exchanging control messages therebetween, the control messages specifying a type of service request; and a controller unit for transiting the CPE adapter into either a default state or an alternate state in response to control messages, the default state being a state in which the CPE adapter is in condition for data transfer in the non-channelized format and the alternate state being a state in which the CPE adapter is in condition for data transfer in the either or both of the channelized and non channelized formats; and the controller unit further for selecting a connection of the transceiver either with the telephone interface unit or with the data network interface unit in response to the the type of service request.

27. An CPE adapter according to claim 26 wherein:

the default state is a state in which the CPE adapter transceiver and the access server transceiver communicate with each other to receive and deliver data services traffic in a non-channelized format; and the alternate state is a state in which the CPE adapter transceiver and the access server transceiver communicate with each other to allocate a portion of the available bandwidth to receive and deliver voice services in a channelized format and to allocate the remaining bandwidth to receive and deliver data services traffic in a non-channelized format.

28. An access server according to claim 27 wherein:

in the alternate state, the CPE adapter transceiver and the access server transceiver communicate with each other to activate voice compression functionality.

29. The access server according to claim 28 wherein the transceiver is connected to a CPE adapter by a pair of twisted wires which carry digital signal streams providing a predetermined bandwidth.

30. The access server according to claim 29 wherein the framed digital bit signal streams are transmitted in the 2B1Q line coding scheme.

31. The access server according to claim 30 wherein the available bandwidth is partitioned using the ISDN scheme.

32. The access server according to claim 31 wherein the data network interface unit comprises a UART having RS-232 interfaces, Ethernet, 10BaseT, Token Ring, Token Bus, or FDDI LAN interfaces, X.25, Frame Relay or ATM WAN interfaces.

33. The access server according to claim 32 wherein the PSTN interface unit is a VF or a PRI interface.

34. The access server according to claim 27 wherein the transceiver is connected to a CPE adapter by a pair of twisted wires which carry digital signal streams providing a predetermined bandwidth.

35. The access server according to claim 34 wherein the framed digital bit signal streams are transmitted in the 2B1Q line coding scheme.

36. The access server according to claim 35 wherein the available bandwidth is partitioned using the ISDN scheme.

37. The access server according to claim 36 wherein the data network interface unit comprises a UART having RS-232 interfaces, Ethernet, 10BaseT, Token Ring, Token Bus, or FDDI LAN interfaces, X.25, Frame Relay or ATM WAN interfaces.

38. The access server according to claim 37 wherein the PSTN interface unit is a VF or a PRI interface.

* * * * *